3,346,566
PROCESS OF PREPARING METAL
SALTS OF LACTAMS
Max E. Chiddix and Wiley E. Daniels, Easton, Pa., assignors to General Aniline & Film Corporation, New York, N.Y., a corporation of Delaware
No Drawing. Filed Nov. 30, 1965, Ser. No. 510,663
6 Claims. (Cl. 260—239.3)

This invention relates to an improved process of preparing alkali metal and alkaline earth metal salts of 5-, 6-, and 7-membered lactams in a high state of purity.

It is known that in the polymerization of pyrrolidone and other 5- or 6-membered lactams, an activator such as N-acetyl-2-pyrrolidone, N-acetyl-2-piperidone, and the like, is employed, together with an alkali metal salt of a lactam as a catalyst. The latter have been prepared by several means. One well-known procedure involves the reaction of 2-pyrrolidone with concentrated aqueous sodium or potassium hydroxide solution. The resulting N-sodium or potassium-2-pyrrolidone, however, is heavily contaminated with sodium- or potassium-γ-aminobutyrate.

Another known procedure employs the equimolar reaction of 2-pyrrolidone with sodium or potassium metal. In addition to the sodium- or potassium-2-pyrrolidone, a considerable amount of pyrrolidine (tetrahydropyrrole) is produced by reduction during this procedure. Considerable amounts of this by-product are also formed by the direct reaction of an alkali metal with 2-pyrrolidone.

For the polymerization of ε-caprolactam, it has been proposed that the catalyst be prepared by reacting 2-pyrrolidone with a solution of sodium isopropylate in excess isopropyl alcohol, followed by removal of the isopropyl alcohol under reduced pressure. This procedure leads to large amounts of alcoholysis products of 2-pyrrolidone and a product of substantially lower sodium-2-pyrrolidone assay, i.e., about 83.5%.

In view of the contaminants obtained by the foregoing procedures, lower yields of the alkali metal salts of lactams result which when employed in polymerization reactions diminish the percent conversion.

It is the principal object of the present invention to provide an improved process of preparing alkali metal salts of 5-, 6-, and 7-membered lactams in very high yields and purity. Such salts, when employed in the polymerization of pyrrolidone and other 5- or 6-membered lactams, will give higher conversions of the monomer to polymer.

Other objects and advantages will become clearly manifest from the following description:

We have found that the disadvantages inherent in the prior art procedures are overcome by reacting in any conventional flask or vessel, one equivalent weight of a dry solid alkali metal alkoxide or alkaline earth metal alkoxide in the form of a slurry in an inert liquid-suspending agent, with one molecular weight (mole) of a 5-, 6- or 7-membered lactam and removing the alcohol which is released either by distillation during the reaction, or by filtration after the reaction. In other words, one mole of an alkali metal alkoxide reacts with one mole of a lactam, whereas one-half mole of an alkaline earth metal alkoxide represents the equivalent weight sufficient to react with one mole of lactam. The reaction mixture may be heated about 0.1 to 6 hours at 40° to 200° C. as required. Usually it takes about one hour to remove substantially all of the released alcohol by distillation. The solid alkali metal lactam is then dried by any conventional means prior to its use as a catalyst for the preparation of polyamides such as nylon-6 and nylon-4, or as a useful anhydrous alkaline material for organic reactions or as a catalyst for acetoacetic ester condensations (Claisen reactions) and the like. If the solid metal alkoxide is not available, it can be prepared in situ by first dispersing a metal of Groups 1 and 2 of the Periodical Table in a dry inert liquid-suspending agent and heating the suspension with an equivalent amount of an aliphatic alcohol, either primary, secondary or tertiary, of from 1 to 5 carbon atoms. When all of the alkali metal has reacted, an equivalent amount of the 5-, 6- or 7-membered lactam is added to the suspension, and the reaction mixture stirred while heating for a period of time ranging from 0.1 to 6 hours at a temperature in the range of 40° to 200° C. The alcohol or an azetrope of the alcohol and the inert liquid-suspending agent is distilled out of the slurry, or the alcohol may be removed in the filtration step. After cooling to room temperature, the solid alkali or alkaline earth metal lactam is collected by filtration and dried in any conventional manner, such as, for example, for about 1 to 24 hours at a temperature of about 80–90° C. at atmospheric pressure, or in vacuo at a pressure of from 1 to 50 mm. of mercury.

The metal salts that are employed in preparing the alkoxides of the aforementioned lower aliphatic alcohols include alkali metals of Group 1 of the Periodic Table such as lithium, sodium, potassium, rubidium, cesium, and divalent alkaline earth metals of Group 2, such as beryllium, magnesium, calcium, barium, and strontium. Lower aliphatic alcohols that may be employed in preparing the alkoxides include methanol, ethanol, butanol, isopropanol, isobutyl alcohol, t-butanol, n-amyl alcohol, isoamyl alcohol and t-amyl alcohol.

As examples of inert liquid-suspending agents which are employed in the foregoing reactions, the following are illustrative: benzene, toluene, xylene, hexane, heptane, octane, cyclohexane, mineral oil, petroleum ether, ethylene glycol dimethyl ether, di-n-propyl ether, tetrahydrofuran, dioxane, diphenyl ether, di-ethylene glycol diethyl ether, and the like.

It is to be noted that the nature or character of the inert liquid-suspending agent is immaterial so long as it is liquid and unreactive with the alkali or alkaline earth metal alkoxide and the 5-, 6- or 7-membered lactam under the reaction conditions. The amount of such suspending agent employed in the reaction is not critical and any amount which will yield a workable slurry is considered sufficient. The improvements of the process of the present invention over the prior art procedures are as follows:

(1) No formation of reduction products is observed as when the free alkali metals are directly contacted with the lactam. For example, 2-pyrrolidone is not partly converted to pyrrolidine.

(2) The use of the alkoxide anion in the absence of water prevents the undesirable side reaction of ring opening to form the amino acid salt.

(3) The product is formed in high purity in the reaction medium as an easily filterable powder. Recovery is thus simplified.

(4) The suspending agent and regenerated alcohol from which the alkoxide was prepared can be recovered readily and recycled, thus reducing the cost.

The 5-, 6- and 7-membered lactams which are reacted with the alkali metal and alkaline earth metal alkoxides are characterized by the formula:

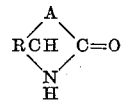

wherein R is either a hydrogen atom or an alkyl group of from 1 to 4 carbon atoms, and A is an alkylene group furnishing from 2 to 10 carbon atoms between the $$R\overset{A}{\underset{H}{\overset{|}{C}H}}\text{ group and the }C=O\text{ group}$$

the alkylene group either being straight-chained or branched.

The lactams conforming to the foregoing formula and which are converted to alkali metal salts include 2-pyrrolidone, 3-methyl-2-pyrrolidone, 3-ethyl-2-pyrrolidone, 3,3-dimethyl-2-pyrrolidone, 3,3,5-trimethyl-2-pyrrolidone, 3,4,5-trimethyl-3-ethyl - 2 - pyrrolidone, 3,5,5-trimethyl-2-pyrrolidone, 4,4-dimethyl-2-pyrrolidone, 4,5-dimethyl-2-pyrrolidone, 4-methyl-2-pyrrolidone, 4 - methyl - 2 - pyrrolidone, 4 - ethyl - 2 - pyrrolidone, 4,5,5-trimethyl-2-pyrrolidone, 5-methyl-2-pyrrolidone, 5-ethyl-2-pyrrolidone, 5,5-dimethyl-2-pyrrolidone, 5-methyl-5-ethyl pyrrolidone, 3-butyl pyrrolidone, 5-butyl pyrrolidone; piperidone, 3-methyl-2 - piperidone, 3,5 - dimethyl - 2 - piperidone, 4-methyl-2-piperidone, 4-ethyl-2-piperidone, 4,4 - dimethyl-2-piperidone, 5 - methyl - 2 - piperidone, 5,5-dimethyl-2-piperidone, 5,5 - diethyl - 2 - piperidone, 5,6 - dimethyl-2-piperidone, 5-ethyl-6-methyl-2-piperidone, 6-methyl-2-piperidone, 6 - ethyl - 2 - piperidone, 6 - ethyl-3-methyl-2-piperidone, 6-butyl-2-piperidone; caprolactam, 3-methyl caprolactam, 3,5-dimethyl caprolactam, 3,6-dimethyl caprolactam, 3,5,7-trimethyl caprolactam, 4-methyl caprolactam, 4,6-dimethyl caprolactam, 4,7-dimethyl caprolactam, 4-ethyl-6-methyl caprolactam, 5-methyl caprolactam, 5-ethyl caprolactam, 6-methyl caprolactam, 6-ethyl caprolactam, 6-ethyl-4-methyl caprolactam, 7-methyl caprolactam, 7-ethyl caprolactam, 7,7-diethyl caprolactam, 5-tert-butyl caprolactam.

In addition to the foregoing lactams, those disclosed in U.S.P. 2,265,450, 2,335,454, and 3,097,087 may also be used in preparing the alkali metal salts of lactams as well as 3-morpholinone disclosed in U.S.P. 2,987,509, e.g., 5-methyl-3-morpholinone, 5-ethyl-3-morpholinone, 3,5-dimethyl-3-morpholinone, 2-piperazonone (e.g., JACS 62, 1202 (1940)), 3,3-dimethyl-2-ketopiperazine, 3-methyl-2-keptopiperazine; and the lactams prepared from omega-aminocapric acid, omega-aminocaproic, omega-aminododecanoic acid and omega-aminoundecanoic acid.

The following examples will illustrate how a metal alkoxide may be prepared in situ and then reacted with a lactam as well as the reaction of a preformed solid metal alkoxide with a lactam.

*Example 1*

Into a 3-liter, 4-necked flask fitted with a stirrer, thermometer, addition funnel and a 1½" x 18" glass-packed fractionating column were charged 2 liters of benzene. The benzene was brought to reflux and 5% distilled out to dry the system. On cooling there were added 227 grams (4 moles) 95% active sodium methylate. The system was again brought to reflux and there were added 340 grams (4 moles) 2-pyrrolidone over a period of one hour. When the theoretical amount (128 grams) of in situ produced methanol was recovered as the methanol-benzene azeotrope, the system was allowed to cool and the contents of the pot were filtered. The filtered cake was dried at 80–90° C./29 in. of Hg for 24 hours. There were recovered 434 grams of dried solid sodium-2-pyrrolidone (100% of theory).

*Example 2*

Magnesium methoxide, 86 grams, was suspended in 1500 ml. of m-xylene and the solution heated to reflux. To this were added, at the reflux, 160 ml. of 2-pyrrolidone. The reaction was continued at reflux while distilling off methanol through a 36" fractionating column packed with glass helices. After the formation of methanol had virtually ceased, the m-xylene was removed by distillation, and the residue dried in a vacuum dessicator maintained at 35–45° C. at 2 mm. Hg. A total of 167 g. of product, dried to constant weight, was obtained (87% yield).

*Example 3*

A charge of 2900 ml. of benzene was placed in a 5-liter, 3-necked flask equipped with a stirrer, a glass-packed fractionating column, and a heating mantle. The benzene was dried by distilling off the azeotrope of benzene and water. To the residue were added portion-wise, at the reflux under an atmosphere of nitrogen, 38.6 grams of freshly cut potassium. This was then stirred and the potassium dispersed. A total of 250 ml. of t-butyl alcohol was added gradually at the reflux. When all the potassium had reacted, there were added rapidly at the reflux 78 ml. of 2-pyrrolidone. From this point, the azeotrope of t-butyl alcohol and benzene was distilled off leaving a slurry of product in the benzene. After this operation, the flask and its contents were cooled to room temperature and the potassium pyrrolidone filtered off and dried in vacuo overnight at 80–90° C. The material assayed 94.0% potassium pyrrolidone. There were 107 grams of product obtained, or an 88.5% yield based on potassium metal.

*Example 4*

The quantities and procedure of Example 3 were followed, except that after the addition of the pyrrolidone, the reaction mixture was stirred for three hours but no alcohol or benzene was distilled out. After cooling to room temperature, the dispersion was filtered, separating the solid potassium pyrrolidone from the t-butyl alcohol and benzene. The solid was dried as in Example 3. The isolated material (100 g.) assayed 97.5% potassium pyrrolidone.

*Example 5*

A suspension of finely divided potassium (39 g.) in refluxing benzene (2900 cc.) was treated with 50 ml. of methanol, added drop-wise, over a three-hour period, under an atmosphere of nitrogen. After the addition was completed, the azeotrope of benzene and excess methanol was distilled out of the suspension of potassium methoxide. There were then added 90 ml. of 2-pyrrolidone. Once again the methanol-benzene azeotrope was distilled out. The dispersion of potassium pyrrolidone was then cooled, the product filtered off and dried as in Example 2.

*Example 6*

Anhydrous t-amyl benzene was employed to disperse 7.0 grams of lithium metal at the reflux. To this dispersion (after cooling to 60° C.) were added 50 ml. of t-butyl alcohol. The reaction mixture was again heated to the reflux (189°) and excess t-BuOH distilled off. Pyrrolidone (190 ml.) was added drop-wise at the reflux and t-butanol distilled out as rapidly as it was formed. When no more t-BuOH distilled out, the mixture was cooled to room temperature and filtered. The product was washed with benzene and dried. The product contained 7.4% lithium by analysis indicating 97.5% lithium pyrollidone.

*Example 7*

The procedure of Example 3 was followed except that the lactam used was caprolactam. Thus, 113 grams of caprolactam dissolved in 300 cc. of benzene were added to the dispersion of potassium t-butoxide. Excess t-butanol was distilled out as the benzene azeotrope. The resulting dispersion of potassium caprolactam was cooled, filtered, and the product dried as in Example 2. A 98% yield of potassium salt of caprolactam was obtained.

*Example 8*

The procedure of Example 3 was followed except that 0.1 mole of potassium t-butoxide stirred in 300 ml. of benzene was treated with 9.9 grams of 4-methyl-2-pyrrolidone dissolved in 100 ml. of benzene. The excess t-butyl alcohol was removed as the benzene azeotrope. The product, potassium-4-methyl-2-pyrrolidone, was filtered and dried as in Example 2 and a 93% yield was obtained.

*Example 9*

The procedure of Example 3 was repeated except that the potassium t-butoxide slurry was reacted with an equivalent amount of 2-piperidone instead of 2-pyrrolidone.

The excess t-butyl alcohol which formed was removed as the benzene azeotrope. The resultant potassium-2-piperidone was filtered and dried as in Example 2 and a 96% yield was obtained. The product assayed 98% potassium-2-piperidone.

*Example 10*

The procedure of Example 3 was followed except that a molecular equivalent amount of the lactam of omega aminododecanoic acid was substituted for 2-pyrrolidone. After removing the t-butanol, filtering, and drying, the potassium salt of the lactam was obtained in 97% yield with an assay of 95%.

*Example 11*

Into 17,217 grams of 2-pyrrolidone were charged 541 grams of sodium methoxide. A vacuum was quickly applied, and 541 ml. of 2-pyrrolidone distilled out to insure complete removal of methanol. This catalyst solution, 4.75 mole percent in sodium pyrrolidone, was initiated with 0.68 mole percent dodecyltrichlorosilane. Only a 40% yield of polymer (nylon-4) of relative viscosity (1.0% solution in m-cresol) 3.87 was obtained.

However, when using an equal amount of sodium pyrrolidone prepared as in Example 1 together with pyrrolidone and an equal portion of dodecyltrichlorosilane, a 70% conversion to nylon-4 with a relative viscosity of 3.50 (1% in m-cresol) was obtained.

The foregoing example is illustrative of the superior polymerization catalyst solution that is obtained by forming sodium pyrrolidone from sodium methoxide by the method of this invention, as compared to using sodium methoxide in the polymerization mixture.

*Example 12*

To 50 ml. of isopropyl alcohol, at the reflux, in a round-bottomed flask equipped with reflux condenser protected against atmospheric moisture, were added 2.9 grams of freshly cut sodium. After 3 hours all the sodium had dissolved. A solution of 10 cc. pyrrolidone in 90 ml. of isopropyl alcohol was added. This was refluxed for 20 minutes to insure complete reaction. The isopropyl alcohol was then evaporated at room temperature with a high vacuum pump. The dried product assayed only 83.5% sodium pyrrolidone, as compared to 97.5% in the case of Example 1.

The above example illustrates the poor quality (low assay) of sodium pyrrolidone produced when it is prepared in excess alcohol and in the absence of the inert liquid-suspending agent, as described in U.S.P. 2,727,017.

In order to determine whether the use of the metal lactams prepared in accordance with the present invention as catalysts in the polymerization shows any advantages, two polymerization reactions to make nylon-4 were conducted, according to the procedure of Example 2 of U.S. Patent 2,809,958, while employing N-acetyl pyrrolidone as the initiator and comparing the results obtained with potassium pyrrolidone of Example 1 above and the potassium pyrrolidone prepared in situ with potassium hydroxide as in Example 2 of said patent. The results of these two polymerizations are shown in the following table:

| Examples | Initiator[1] Conc., mole percent | Catalyst Conc.,[2] mole percent | Rel.[3] Viscosity | Conversion to Polymer, percent | Catalyst Source |
|---|---|---|---|---|---|
| 13 | 0.47 | 2.5 | 18.7 | 80.5 | [4] |
| 14 | 0.47 | 2.5 | 4.4 | 70.0 | [5] |

[1] The initiator used was N-acetyl-2-pyrrolidone.
[2] Concentration of the potassium salt of 2-pyrrolidone in 2-pyrrolidone.
[3] Relative viscosity measured at 1% in m-cresol.
[4] The potassium pyrrolidone was prepared by the method of Example 1 above.
[5] The potassium pyrrolidone was prepared as in Example 2 of U.S. Patent 2,809,958 using potassium hydroxide.

From the foregoing table, it is apparent that much higher relative viscosities and, therefore, higher molecular weights can be achieved by using the catalysts prepared in accordance with the process of the present invention. In addition, conversions are improved, thus lowering the cost of the polymer.

We claim:
1. The process of preparing metal salts of lactams which comprises heating at reflux 1 equivalent weight of a metal alkoxide of metals of Groups 1 and 2 of the Periodic Table wherein the alkyl group of the alkoxide contains from 1 to 5 carbon atoms with a molecular weight of a lactam having the formula:

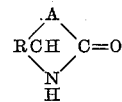

wherein R is a member of the class consisting of hydrogen and alkyl of from 1 to 4 carbon atoms and A is an alkylene group of 2 to 10 carbon atoms, in the presence of an inert liquid-suspending agent selected from the group consisting of liquid aliphatic and aromatic hydrocarbons and ethers of at least 6 carbon atoms, removing the alcohol released from said alkoxide and recovering the alkali metal salt of said lactam.

2. The process according to claim 1 wherein the said alkali metal alkoxide is sodium methoxide.

3. The process according to claim 1 wherein the said alkali metal alkoxide is potassium methoxide.

4. The process according to claim 1 wherein the said metal alkoxide is magnesium methoxide.

5. The process according to claim 1 wherein the said metal alkoxide is potassium-t-butoxide.

6. The process according to claim 1 wherein the said metal alkoxide is lithium-t-butoxide.

References Cited

Tafel and Wassmuth: "Berichte," vol. 40, pp. 2833–5 (1907).

WALTER A. MODANCE, *Primary Examiner.*

R. BOND, *Assistant Examiner.*